United States Patent [19]

Ishido et al.

[11] Patent Number: 4,521,571
[45] Date of Patent: Jun. 4, 1985

[54] PROCESS FOR PREPARING POLYESTER ELASTOMERS

[75] Inventors: Takatsugu Ishido; Takeshi Horikawa, both of Himeji, Japan

[73] Assignee: Daicel Chemical Industries, Ltd., Sakai, Japan

[21] Appl. No.: 630,451

[22] Filed: Jul. 11, 1984

[30] Foreign Application Priority Data

Jul. 25, 1983 [JP] Japan ................................ 58-135385

[51] Int. Cl.$^3$ ............................................. C08G 63/76
[52] U.S. Cl. .................................... 525/437; 525/418; 528/300; 528/301; 528/302; 528/308
[58] Field of Search ................ 525/418, 437; 528/300, 528/301, 302, 308

[56] References Cited

U.S. PATENT DOCUMENTS

| | | | |
|---|---|---|---|
| 3,595,937 | 7/1971 | Weisseruel et al. | 525/437 X |
| 4,122,073 | 10/1978 | Georgoudis | 525/437 X |
| 4,251,652 | 2/1981 | Tanaka et al. | 525/437 X |
| 4,328,333 | 5/1982 | Barbee et al. | 528/302 X |
| 4,381,379 | 4/1983 | Toga et al. | 525/437 X |
| 4,387,213 | 6/1983 | Horlbeck et al. | 525/437 |

*Primary Examiner*—Lucille M. Phynes
*Attorney, Agent, or Firm*—Flynn, Thiel, Boutell & Tanis

[57] ABSTRACT

A process for preparing polyester elastomers from a dicarboxylic acid, mainly an aromatic dicarboxylic acid, or an ester-forming derivative thereof, a low molecular weight glycol, mainly 1,4-butanediol, and a polyoxyalkylene glycol is provided. This process is characterized in that at least 10 wt. % of the polyoxyalkylene glycol comprises a poly(oxy-2-methyl-3,3-propylene)diol. The obtained polyester elastomers have excellent low-temperature properties and elastic recovery.

12 Claims, No Drawings

PROCESS FOR PREPARING POLYESTER ELASTOMERS

BACKGROUND OF THE INVENTION

1. Field of the Invention

The present invention relates to a process for preparing polyester elastomers having rubbery elasticities including excellent low-temperature resistance and recovery.

2. Description of the Prior Art

Recently, a thermoplastic elastomer having a so-called micro-phase separation structure, i.e. having a soft segment which realizes a soft, rubbery elasticity and a hard segment which realizes a hard, aggregated domain by forming physical crosslinkings according to a mutual action such as crystallization or hydrogen bonding in the molecular chain, has attracted attention, since the following facts have been found: the thermoplastic elastomer can be molded by a process generally employed for molding thermoplastic resins; substances widely ranging from a rubbery substance to a plastic substance can be obtained easily by suitably selecting the soft segment-forming and the hard segment-forming components; and the micro-phase separation structure of this material has special properties such as antithrombotic activities, membrane separation functions and adhesiveness.

The soft segment-forming components of the thermoplastic elastomers preferred from the viewpoint of low-temperature properties are polyoxyalkylenediols such as polyoxyethylene glycol, poly(oxy-1,2-propylene)glycol, polytetramethylene glycol, block or random copolymer of ethylene oxide and propylene oxide, and block or random compolymer of ethylene oxide and tetrahydrofuran. Among them, polyoxytetramethylene glycol is recommended from the viewpoint of its thermal resistance, water resistance, low-temperature properties, elastic recovery and mechanical strength. This compound is now in use as the soft segment-forming component for polyester elastomers.

However, when the polyoxytetramethylene glycol having a molecular weight exceeding a certain value is used, crystallization is caused in the soft segment due to its linear structure and, therefore, the properties thereof such as low-temperature properties and elastic recovery are not always satisfactory.

SUMMARY OF THE INVENTION

After intensive investigations made for the purpose of solving these problems, the inventors have found that the purpose can be attained by using poly(oxy-2-methyl-1,3-propylene) diol as at least a part of the polyoxyalkylene glycol to be used as the soft segment-forming component. The present invention has been completed on the basis of this finding.

The present invention provides a process for preparing polyester elastomers from a dicarboxylic acid (mainly an aromatic dicarboxylic acid) or an ester-forming derivative thereof, a low molecular weight glycol (mainly 1,4-butanediol) and a polyoxyalkylene glycol, characterized in that at least 10 wt. % of the polyoxyalkylene glycol comprises poly(oxy-2-methyl-1,3-propylene) diol.

DETAILED DESCRIPTION OF THE PREFERRED EMBODIMENTS

The typical aromatic dicarboxylic acids usable in the present invention include, for example, terephthalic, isophthalic, 1,5-naphthalenedicarboxylic, 2,6-naphthalenedicarboxylic, or 2,7-naphthalenedicarboxylic acid, bis(p-carboxyphenyl) methane, ethylene-bis(p-oxybenzoic acid), diphenyl ether dicarboxylic acid, diphenyl sulfone dicarboxylic acid, diphenoxyethanedicarboxylic acid and their ester-forming derivatives such as lower alkyl esters. e.g. methyl or ethyl esters, phenyl esters, acid chlorides and acid anhydrides. The aromatic nuclei of these aromatic dicarboxylic acids and their ester-forming derivatives may be substituted with an alkyl group having 1 to 4 carbon atoms. Particularly terephthalic acid or its ester is a preferred acid component forming a hard domain. At least 80 molar % of the dicarboxylic acid component should comprise an aromatic dicarboxylic acid or its ester-forming derivative. The balance (up to 20 molar %) of the dicarboxylic acid component may comprise succinic, adipic, sebacic or dodecanedioic acid or an ester-forming derivative thereof. However, when the amount of these aliphatic dicarboxylic acid components exceeds 20 molar %, the intended polyester elastomer have unsatisfactory thermal resistance, mechanical strength and rubbery elasticity unfavorably.

The low molecular weight glycols comprise mainly 1,4-butanediol. A part, namely, up to 20 molar %, of the low molecular weight glycols may comprise other low molecular weight aliphatic glycols, ether glycols and alicyclic glycols, such as ethylene glycol, propylene glycol, 1,2-butylene glycol, trimethylene glycol, 2-methyl-1,3-propylene glycol, neopentyl glycol, 1,3-butanediol, octamethylene glycol, polymethylene glycol, diethylene glycol, triethylene glycol, 1,4-cyclohexanedimethanol and 1,4-cyclohexanediol. The ester-forming derivatives of the glycols include lower fatty acid esters and carbonates of the glycols.

Among the polyoxyalkylenediols to be used as the soft segment-forming components according to the present invention, poly(oxy-2-methyl-1,3-propylene)-diol is prepared by a cationic ring-opening polymerization of 3-methyloxetane.

Namely, a combination of perchloric acid/acetic anhydride or perchloric acid/very strong acid such as fuming sulfuric acid or fluorosulfonic acid is added to 3-methyloxetane to effect the ring-opening polymerization reaction. The resulting reaction product is saponified to obtain a poly(oxy-2-methyl-1,3-propylene)diol. The molecular weight of the poly(oxy-2-methyl-1,3-propylene)diol may be in the range of about 400 to 10,000. The molecular weight can be controlled by suitably selecting the cationic ring-opening polymerization conditions such as initiator, concentration and method of the addition of the monomer and the catalyst. Generally, a polymer of a low molecular weight is obtained when a combination of perchloric acid/acetic anhydride or perchloric acid/fuming sulfuric acid is used and a polymer of a high molecular weight is obtained when fluorosulfonic acid is used. Further, the poly(oxy-2-methyl-1,3-propylene)diol having a high molecular weight is obtained when the concentration of the initiator used is low. When the molecular weight of the polymer is below about 400, the characteristic properties of the soft domain cannot be realized. On the other hand, when the molecular weight thereof exceeds about 10,000, it becomes difficult to obtain a polyester elastomer having a high molecular weight because a problem of compatibility with other components used for forming the polyester elastomer structure occurs, though the phase separation structure becomes clearer and the characteristic properties of the soft domain are realized. Therefore, to facilitate the preparation, the poly(oxy-2-methyl-1,3-propylene)diol having a molecular weight of about 400 to 10,000, particularly about 500 to 5,000 is preferred.

The poly(oxy-2-methyl-1,3-propylene)diol may be used either alone or in the form of a mixture with another polyoxyalkylene glycol. In the latter case, the amout of the poly(oxy-2-methyl-1,3-propylene)diol should be at least 10 wt. % based on the mixture. It is considered that the methyl side chain of the soft segment derived from the poly(oxy-2-methyl-1,3-propylene) diol inhibits the crystallization of a soft segment comprising the other polyoxyalkylene glycol and, therefore, the low-temperature properties and elastic recovery intended in the present invention are obtained. However, when the amount of the poly(oxy-2-methyl-1,3-propylene) diol is less than 10 wt. %, the characteristic features of the invention cannot be obtained.

The polyoxyalkylene glycols usable in combination with the poly(oxy-2-methyl-1,3-propylene)diol are not particularly limited. Various polyoxyalkylene glycols are available on the market. However, polyoxyethylene glycol and ethylene oxide/propylene oxide block polymer are not preferred due to their high hygroscopicities; poly(oxy-1,2-propylene)glycol is also not preferred because of its reactivity due to the secondary alcoholic group; and ethylene oxide/tetrahydrofuran block copolymer is not preferred in view of its poor thermal stability. The most preferred polyoxyalkylene glycol to be used together with the poly(oxy-2-methyl-1,3-propylene)diol is polyoxytetramethylene glycol.

The relative amount of the polyoxyalkylene glycol(s) to the total amount of the polyester elastomer is not particularly limited. However, this amount is generally 30 to 60 wt. % and is selected suitably depending on the physical properties required of the final moldings of the polyester elastomer. However, when the polyester elastomer is to be used as a modifying agent for another polyester resin or polycarbonate resin, the polyester elastomer containing larger than 60 wt. % of the soft segment may be used.

The polyester elastomer may be prepared from the above-mentioned components by an ordinary process for the preparation of thermoplastic polyesters. In the first step of this process, an interesterification reaction is effected with a dicarboxylic ester or an esterification reaction is effected with a free dicarboxylic acid. It is also possible to effect both the esterification and interesterification reactions in the first step using both the dicarboxylic acid ester and free dicarboxylic acid. In the second step of the process, an ordinary polycondensation reaction is effected at a high temperature under a reduced pressure. Generally, the esterification and interesterification reactions in the first step and the polycondensation reaction in the second step are carried out in the presence of a catalyst. It has been known that numerous compounds are usable as the catalyst. Among them, an alkali metal or alkaline earth metal acetate is particularly effective in the first step and a compound of zinc, manganese, cobalt, antimony, germanium, titanium or tin is particularly effective in the second step. Catalysts effective in both the first and the second steps include, for example, a tetraalkyl titanate a combination of a tetraalkyl titanate and magnesium or calcium acetate or a mixture of calcium or zinc acetate and antimony trioxide. The catalyst is used in an amount of 0.005 to 0.2 wt. % based on the total reactants.

An antioxidant may be added to the reaction system during or after the preparation of the polyester elastomer. It is particularly preferred, however, to add an antioxidant which does not inhibit the polycondensation reaction or which does not damage the functions of the catalyst to the reaction system before the polyoxyalkylene glycol is exposed to a high temperature or, more particularly, before the polycondensation reaction in the second step is begun so as to prevent the oxidative deterioration of the polyoxyalkylene glycol. The antioxidants include aliphatic, aromatic or alkyl group-substituted aromatic esters of phosphoric and phosphorous acids as well as phenol derivatives, particularly hindered phenols having a group of a high steric hindrance.

If necessary, the polyester elastomer may contain other additives used for improving the properties of the final product such as an antioxidant; a filler or reinforcing agent, e.g. kaolin, silica, mica, talc, titanium dioxide, alumina, glass fibers or carbon fibers; lubricant or releasing agent, e.g. zinc stearate or stearic acid bisamide; U.V. absorber; dye or pigment used for coloring; and flame retardant, e.g. octabromodiphenyl or tetrabromobisphenol polycarbonate.

The following examples will further illustrate the present invention.

In the examples, the hydroxyl value was determined by phthalic anhydride/pyridine method and the acid value was determined by direct neutralization titration method using a pyridine solution.

The tensile strength and elongation were determined by punching dumbbell test pieces according to JIS from a pressed sheet having about 1 mm thickness, leaving the test pieces to stand at 23° C. in a relative humidity of 65% for 10 days or longer and measuring the strength by means of a Tensilon universal tensile tester at a crosshead speed of 50 mm/min. The tensile strength at break, tensile elongation at break, yield strength in tension, 100% modulus and 300% modulus were determined from a stress-strain curve obtained.

The instantaneous elastic recovery and delayed elastic recovery were determined by providing bench marks at intervals of a on the dambbell test pieces, stretching the test pieces to 200%, keeping the stretched state for 5 min, removing the stress to make them free, immediately thereafter measuring a distance b between the marks, measuring a distance c between the marks again 10 min after the removal of the stress and determining the recoveries according to the following formulae:

$$\text{Instantaneous elastic recovery} = \frac{2a - b}{a} \times 100\%$$

$$\text{Delayed elastic recovery} = \frac{2a - c}{a} \times 100\%$$

The reduced specific viscosity $\eta sp/c$ was determined in a concentration of 1 g/l in a solvent mixture of tetrachloroethane and phenol (weight ratio: 1/1) at 25° C.

The melting point and glass transition temperature were determined by means of a differential scanning calorimeter (DSC) at a temperature rise rate of 20° C./min.

The bending recovery at low temperature was determined by using test pieces having 20 mm width, 120 mm length and 1 mm thickness. The test pieces were bent at an angle of 180° around a glass rod having 30 mm diameter by means of clips at −30° C. for 30 min. Then, the clips were removed at that temperature. The angles of the test pieces were measured immediately after the removal of the clips and 10 min thereafter. The results were represented by percentage based on 180° angle.

EXAMPLE 1

The poly(oxy-2-methyl-1,3-propylene)diol being used in the present invention was prepared as follows: 6.8 ml of acetic anhydride was added to 100 ml of anhydrous 3-methyloxetane obtained by dehydration over potassium hydroxide followed by reflux in the presence of metallic sodium for 1 h and distillation. The mixture was cooled to −70° C. by means of a dry ice/methanol freezing mixture. 2.8 ml of 70% perchloric acid was added dropwise to the mixture under stirring over about 20 min. After completion of the addition, the reaction was continued at −70° C. for 1 h and then the temperature of the reaction system was elevated slowly to room temperature in about 1 h. In this step, the system was kept away from the direct contact with the atmosphere and sealed in the dry nitrogen atmosphere. Then the system was left at room temperature for 50 h to effect polymerization, thereby obtaining a colorless, transparent, viscous liquid. About 100 ml of pure water was added to the liquid to terminate the reaction. The reaction mixture was heated to 90° C. under stirring for about 1 h to remove unreacted 3-methyloxetane monomer. Then, an aqueous layer was removed and 200 ml of a ½ N solution of potassium hydroxide in ethanol was added to an organic layer and the mixture was stirred under heating to 90° C. for about 2 h to effect the saponification. After completion of the saponfication, ethanol was distilled off and ether was added again to the residue to obtain an ether solution. Active carbon and active clay were added thereto and the mixture was left to stand for several hours. A solid thus formed was filtered out and ether was distilled off. About 67 g (yield: 79.5%) of poly(oxy-2-methylpropylene)diol was obtained in the form of a colorless, transparent, viscous liquid. The product had a hydroxyl value of 100.9 mgKOH/g, an acid value of 1.2 mgKOH/g and a number-average molecular weight determined from the hydroxyl value of 1112.

Then, 30.4 g of the obtained poly(oxy-2-methylpropylene)diol, 42.2 g of dimethyl terephthalate and 27.4 g of 1,4-butanediol were charged in a 200-ml stainless steel reaction vessel provided with a stirrer of helical ribbon type and then the temperature elevation was begun in nitrogen atmosphere. The temperature was elevated to 160° C. in about 30 min. 0.035 g of tetrabutoxy titanate used as a catalyst was added thereto and the interesterification reaction in the first step was effected under vigorous stirring at 170° C. for 2 h. In the course of this reaction, additional 0.035 g of tetrabutoxy titanate was added at a temperature of 220° C. and 0.08 g of tridecyl phosphite used as a thermal stabilizer was further added. The pressure reduction in the reaction vessel was begun at 250° C. and a pressure of 0.2 to 0.3 mmHg was realized after about 1 h. The reaction was continued under these conditions for 4 h. The reaction product in the form of strands was taken out of the reaction vessel and then shaped into pellets. The pellets were molded into a pressed sheet having about 1 mm thickness.

COMPARATIVE EXAMPLE 1

The same procedure as in Example 1 was repeated expect that poly(oxytetramethylene) glycol having a number-average molecular weight of 1000 was used.

The results of the tests of the sheets obtained in Example 1 and Comparative Example 1 are shown below.

| | | Example 1 | Comp. Ex. 1 |
|---|---|---|---|
| reduced specific viscosity | | 1.61 | 1.63 |
| tensile strength at break | | 430 Kgf/cm$^2$ | 408 Kgf/cm$^2$ |
| tensile elongation at break | | 855.0% | 810/0% |
| 100% modulus | | 151 Kgf/cm$^2$ | 134 Kgf/cm$^2$ |
| 300% modulus | | 185 Kgf/cm$^2$ | 160 Kgf/cm$^2$ |
| instantaneous elastic recovery | | 80% | 55% |
| delayed elastic recovery | | 90% | 65% |
| DSC | melting point | 197.0° C. | 198.5° C. |
| | glass transition temp. | −62.5° C. | −52.0° C. |
| bending recovery at low temp. | | | |
| | immediately after removal of clip | 84% | 64.0% |
| | after 10 min. | 94.0% | 83.0% |

EXAMPLE 2

A polyester elastomer was synthesized in the same manner as in Example 1 except that 15.7 g of poly(oxy-2-methyl-1,3-propylene)diol having a number-average molecular weight of 1407, 15.7 g of poly(oxytetramethylene) glycol having a number-average molecular weight of 1000, 43.6 g of dimethyl terephthalate and 24.9 g of 1,4-butanediol were used.

EXAMPLE 3

A polyester elastomer was synthesized in the same manner as in Example 1 except that 22.8 g of poly(oxy-2-methyl-1,3-propylene)diol, 48.0 g of dimethyl terephthalate, 14.6 g of 1,4-butanediol and 14.6 g of 2-methyl-1,3-propylenediol were used.

EXAMPLE 4

A polyester elastomer was synthesized in the same manner as in Example 1 except that 40.7 g of poly(oxy-2-methyl-1,3-propylene)diol, 38.1 g of dimethyl terephthalate and 21.1 g of 1,4-butanediol were used.

The results obtained in Examples 2 to 4 were as shown below:

| | | Ex. 2 | Ex. 3 | Ex. 4 |
|---|---|---|---|---|
| reduced specific viscosity | | 1.68 | 1.56 | 1.57 |
| tensile strength at break | | 491 Kgf/cm$^2$ | 325 Kgf/cm$^2$ | 420.0 Kgf/cm$^2$ |
| tensile elongation at break | | 835.0% | 530.0% | 925.0% |
| 100% modulus | | 176 Kgf/cm$^2$ | 174 Kgf/cm$^2$ | 101.0 Kgf/cm$^2$ |
| 300% modulus | | 203.0 Kgf/cm$^2$ | 206 Kgf/cm$^2$ | 136 Kgf/cm$^2$ |
| instantaneous elastic recovery | | 75% | 83% | 80% |
| delayed elastic recovery | | 85% | 95% | 92% |
| DSC | melting point | 173° C. | 206° C. | 187° C. |
| | glass transition temp. | −61° C. | −47° C. | −68° C. |
| bending recovery at low | | | | |

|  | Ex. 2 | Ex. 3 | Ex. 4 |
|---|---|---|---|
| -continued | | | |
| temp. | | | |
| immediately after removal of clip | 84.0% | 85.0% | 70% |
| after 10 min. | 92% | 96.2% | 85% |

The embodiments of the invention in which an exclusive property or privilege is claimed are defined as follows:

1. A process for preparing a polyester elastomer which comprises the step of polymerizing a dicarboxylic acid containing mainly an aromatic dicarboxylic acid, or an ester-forming derivative thereof, with a low molecular weight glycol containing mainly 1,4-butanediol and a polyoxyalkylene glycol, at least 10 wt. % of the polyoxyalkylene glycol being a poly (oxy-2-methyl-1,3-propylene)diol.

2. A process as claimed in claim 1, in which said dicarboxylic acid comprises at least 80 mole % of the aromatic dicarboxylic acid and said low molecular weight glycol comprises more than 80 mole % of 1,4-butanediol.

3. A process as claimed in claim 1, in which said poly(oxy-2-methyl-1,3-propylene)diol has a molecular weight of 400 to 10,000 and is contained in the resultant polyester elastomer in an amount of 30 to 60 percent by weight.

4. A process as claimed in claim 2, in which said poly(oxy-2-methyl-1,3-propylene)diol has a molecular weight of 400 to 10,000 and is contained in the resultant polyester elastomer in an amount of 30 to 60 percent by weight.

5. A process as claimed in claim 1, in which said poly(oxy-2-methyl-1,3-propylene)diol is used as the whole polyoxyalkylene glycol.

6. A process as claimed in claim 2, in which said poly(oxy-2-methyl-1,3-propylene)diol is used as the whole polyoxyalkylene glycol.

7. A process as claimed in claim 3, in which said poly(oxy-2-methyl-1,3-propylene)diol is used as the whole polyoxyalkylene glycol.

8. A process as claimed in claim 4, in which said poly(oxy-2-methyl-1,3-propylene)diol is used as the whole polyoxyalkylene glycol.

9. A polyester elastomer which has been obtained by a process as defined in claim 1.

10. A polyester elastomer which has been obtained by a process as defined in claim 2.

11. A polyester elastomer which has been obtained by a process as defined in claim 3.

12. A polyester elastomer which has been obtained by a process as defined in claim 4.

* * * * *